US010960308B2

(12) United States Patent
Chimes et al.

(10) Patent No.: US 10,960,308 B2
(45) Date of Patent: *Mar. 30, 2021

(54) RESTORING GAMEPLAY BY REPLAYING PAST INPUTS

(71) Applicant: Blizzard Entertainment, Inc., Irvine, CA (US)

(72) Inventors: Carl Chimes, Irvine, CA (US); Dave Lawrence, Irvine, CA (US); Alan Dabiri, Irvine, CA (US); James Anhalt, Irvine, CA (US); Eric Sutton, Redwood City, CA (US)

(73) Assignee: Blizzard Entertainment, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,862

(22) Filed: Apr. 30, 2019

(65) Prior Publication Data

US 2019/0255440 A1 Aug. 22, 2019

Related U.S. Application Data

(63) Continuation of application No. 15/406,975, filed on Jan. 16, 2017, now Pat. No. 10,272,336, which is a (Continued)

(51) Int. Cl.
A63F 13/493 (2014.01)
A63F 13/79 (2014.01)
(Continued)

(52) U.S. Cl.
CPC ........... *A63F 13/493* (2014.09); *A63F 13/44* (2014.09); *A63F 13/497* (2014.09); *A63F 13/79* (2014.09); *A63F 13/95* (2014.09)

(58) Field of Classification Search
None
See application file for complete search history.

(56) References Cited

U.S. PATENT DOCUMENTS 5,261,820 A 11/1993 Slye et al.
6,231,443 B1 * 5/2001 Asai ..................... A63F 13/5252
463/32
(Continued)

FOREIGN PATENT DOCUMENTS

KR 10-2011-0099301 9/2011

OTHER PUBLICATIONS

Replay Features—Liquipedia—TheStarCraft II Encyclopedia, 2 pages, http://wiki.teamliquid.net/starcraft2/Replay_Features.
(Continued)

*Primary Examiner* — Sunit Pandya
(74) *Attorney, Agent, or Firm* — Hickman Becker Bingham Ledesma LLP

(57) ABSTRACT

Methods, computer-readable media, and computing devices are described herein for restoring gameplay by replaying past inputs. During gameplay, capture logic captures participant inputs that were received to change states of game objects. The capture logic stores the captured information in an electronic record of period(s) of the gameplay. After the period(s) of gameplay, replay logic receives a request to initiate subsequent gameplay beginning from a point in time from a period of past gameplay. The replay logic causes the subsequent gameplay to begin from the point at least in part by loading saved state information and replaying the captured participant inputs.

30 Claims, 7 Drawing Sheets

Related U.S. Application Data continuation of application No. 14/792,469, filed on Jul. 6, 2015, now Pat. No. 9,545,576, which is a continuation of application No. 13/737,902, filed on Jan. 9, 2013, now Pat. No. 9,089,777.

(51) Int. Cl.
  *A63F 13/44* (2014.01)
  *A63F 13/497* (2014.01)
  *A63F 13/95* (2014.01)

(56) References Cited

U.S. PATENT DOCUMENTS

| | | | | |
|---|---|---|---|---|
| 8,088,012 | B2* | 1/2012 | Dutilly | A63F 13/79 463/43 |
| 8,298,059 | B2* | 10/2012 | Ivory | A63F 13/67 463/1 |
| 2004/0204230 | A1* | 10/2004 | Kazama | A63F 13/10 463/24 |
| 2006/0148571 | A1 | 7/2006 | Hossack et al. | |
| 2008/0004095 | A1 | 1/2008 | Hayasaka | |
| 2014/0194211 | A1 | 7/2014 | Chimes et al. | |
| 2015/0306499 | A1 | 10/2015 | Chimes | |

OTHER PUBLICATIONS

Korean Intellectual Property Office, "Search Report" in application No. PCT/US2013/076279, dated Mar. 27, 2014, 9 pages.

Hots Interview with Dustin Browder—StarCraft 2, 3 pages., http://www.youtube.com/watch?feature=player_detailpage&v=z0JHmi62LVg.

E, Christopher, "rFactor 2 Quick Guide: Using "Resume From Replay" as a Save Game", http://steamcommunity.com/sharedfiles/filedetails/?id=560374563, last viewed on Aug. 17, 2016, 5 pages.

Current Claims in application No. PCT/US2013/076279, dated Mar. 2014, 8 pages.

ChessMaster 10th Edition User Manual, dated 2004 Ubisoft Entertainment, 31 pages.

U.S. Appl. No. 14/792,469, filed Jul. 6, 2015, Office Action, dated May 9, 2016.

U.S. Appl. No. 14/792,469, filed Jul. 6, 2015, Notice of Allowance, dated Sep. 16, 2016.

U.S. Appl. No. 13/737,902, filed Jan. 9, 2013, Office Action, dated Oct. 2, 2014.

U.S. Appl. No. 13/737,902, filed Jan. 9, 2013, Restriction Requirement, dated Jun. 4, 2014.

U.S. Appl. No. 13/737,902, filed Jan. 9, 2013, Notice of Allowance, dated Mar. 19, 2015.

Chimes, U.S. Appl. No. 15/406,975, filed Jan. 16, 2017, Office Action, dated Jul. 3, 2018.

* cited by examiner

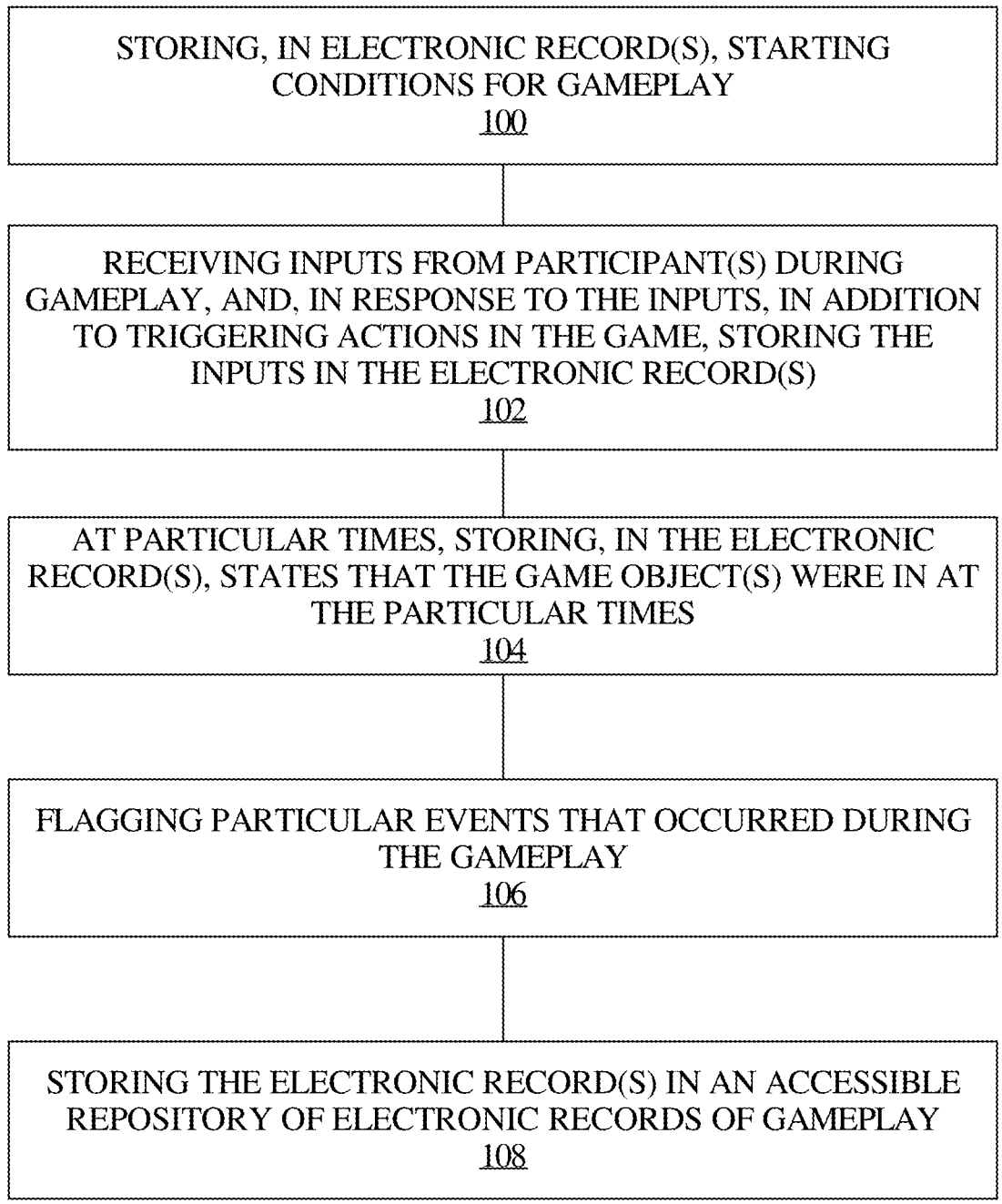

FIG. 2

ACCESSING ELECTRONIC RECORD(S) THAT INCLUDE CAPTURED PARTICIPANT INPUTS RECEIVED DURING PAST GAMEPLAY AND CAPTURED STATES OF GAME OBJECTS AT PARTICULAR TIMES DURING PAST GAMEPLAY
200

LOADING AT LEAST ONE OF THE CAPTURED STATES
202

SIMULATING GAMEPLAY CONTROLLED BY THE CAPTURED PARTICIPANT INPUTS THAT WERE RECEIVED DURING PAST GAMEPLAY, OPTIONALLY DISPLAYING THE SIMULATED GAMEPLAY TO CANDIDATE PARTICIPANTS THAT MAY PARTICIPATE IN SUBSEQUENT GAMEPLAY
204

CUSTOMIZING GAME SETTINGS AND GAME OBJECTS ACCORDING TO PREFERENCES OF CANDIDATE PARTICIPANTS OF SUBSEQUENT GAMEPLAY
206

BEGINNING THE SUBSEQUENT GAMEPLAY WHERE THE CANDIDATE PARTICIPANTS BECOME PARTICIPANTS THAT CAN MANIPULATE GAME OBJECTS DURING THE SUBSEQUENT GAMEPLAY
208

RESTORING GAMEPLAY BY REPLAYING PAST INPUTS

CROSS-REFERENCE TO RELATED APPLICATIONS; BENEFIT CLAIM

This application claims the benefit as a continuation of application Ser. No. 15/406,975 filed Jan. 16, 2017, which claims the benefit as a continuation of application Ser. No. 14/792,469 filed Jul. 6, 2015, which claims the benefit as a continuation of application Ser. No. 13/737,902 titled "Restoring Gameplay by Replaying Past Inputs", filed Jan. 9, 2013, now U.S. Pat. No. 9,089,777 issued Jul. 28, 2015, the entire contents of which are hereby incorporated by reference for all purposes as if fully set forth herein. The applicants hereby rescind any disclaimer of claim scope in the parent application or the prosecution history thereof and advise the USPTO that the claims in this application may be broader than any claim in the parent application.

This application is related to U.S. Pat. No. 5,261,820, entitled "Computer Simulation Playback Method And Simulation," filed Dec. 21, 1990, and issued Nov. 16, 1993, the entire contents of which is hereby incorporated by reference as if fully set forth herein.

TECHNICAL FIELD

The technical field relates to restoring gameplay by replaying past inputs.

BACKGROUND

In many games, unit(s) or character(s) move around in a virtual world and perform action(s) with respect to other game objects. Many complex games are played in multiple game instances over multiple game sessions. A game instance is a portion of the game that has a beginning and an end, often has separate map(s) or virtual world(s), and often has winner(s) and loser(s).

Some games, such as Starcraft® or Warcraft®, are real-time strategy games where human participants compete simultaneously in individual game instances with goals of winning the game instances against other human participants or computer participants. Competing participants may be similarly situated or handicapped at a beginning of each game instance. Often, starting conditions such as handicaps, maps, and teams are configurable by the user. In Starcraft® and Warcraft®, some units can construct buildings that may be used to produce units, and the units can attack or perform some other useful ability. Participants of real-time strategy games are generally not limited as to how quickly they can take actions towards winning a game instance-multiple participants simultaneously provide rapid input to take actions towards winning the game instance. In fact, participants that build and direct their units faster, and react to their opponent's units faster, are often more successful. For example, one participant may build ten units in a minute, and another participant may only build one unit in the same minute. In another example, one participant may perform ten actions before the other participant performs any actions. After playing many game instances, participants of real-time strategy games develop skills that allow them to win more game instances in the future. Participants may be ranked based on their past performance over multiple game instances, and this ranking information may be viewed during the game session.

Other games, such as World of Warcraft® and Diablo®, are roleplaying games (RPGs) where human participants build up virtual characters over multiple game sessions by completing quests and defeating monsters and dungeons. Dungeons may be treated as separate game instances with separate goals that users may complete before leaving the dungeons. World of Warcraft® is an example of a massively multiplayer online RPGs (MMORPGs) where a participant's character(s) may team up with, fight, or otherwise interact in a virtual world with multiple other participants' characters simultaneously. In World of Warcraft® and Diablo®, characters may level up and gain abilities as they defeat monsters and complete missions. MMORPGs often offload processing from participant devices to central servers to reduce the amount of network communications and graphics computations required by the participant devices for each additional character that is added to the environment. Diablo® is an example of an action RPG where a participant's character(s) may team up with or otherwise interact in a virtual world with other participants' characters simultaneously. Action RPGs often localize processing on participant devices to maximize the quality of graphics and speed of the game.

Many other games, such as chess and checkers, are turn-based games where participants proceed one after another in an ordered sequence. Unlike real-time strategy games, the time that elapses between turns in these games generally has no effect on the game other than possibly frustrating the participants. Also in these games, participants generally cannot take multiple turns in a row or take actions simultaneously with other participants. Turn-based games are generally significantly less complex than real-time strategy games, and, as a result, a previously-played instance of a turn-based game can be summarized merely by listing the action that occurred each turn.

There are many other types of games that have not been mentioned, and many of these games apply concepts that are similar to those in the above-mentioned games. Due to the highly competitive nature of complex games, people often try to devote 100% of their attention to the games while playing. Sometimes participants need to save the state of a game instance before the game instance has been completed. Many games save a current state of a game instance in response to a participant's explicit request, during the game instance, to save the current state. For example, the current state of most Nintendo® game instances can be saved via an interface that appears after the start button is pressed.

Some games even save states of game instances periodically for participants without requiring the participants to make explicit requests. Most games are complex enough that it would be impractical or even impossible to save every possible state of the game as the game progresses. For example, a game instance may have eight players controlling an average of a hundred units each for sixty minutes. If states of units, such as unit positions and unit health, were saved every millisecond, 2.88 billion unit states would need to be stored to represent the entire game instance. If each unit state consumed 1 KB of disk space, storing 2.88 billion unit states would consume about 2.68 TB, which goes well beyond the storage capabilities of most personal computers. Other information may also be included within the state of the game, such as research progress, building or structure positions and health, and progress for incomplete buildings or units.

Even if saving this many unit states along with the other information were possible, the computing resources (e.g., memory, disk bandwidth, and processor time) that would be consumed to accomplish this feat would severely degrade gameplay. Due to additional resources that are consumed to save state, most games experience a lag or a temporary decrease in performance when state is saved, and, perhaps for this reason, autosave features generally trigger after minutes rather than after milliseconds since the last save point. When saving states of game instances, most games overwrite previously saved game states to preserve space on disk. In other words, most games maintain only one latest saved state on disk.

If a participant has not explicitly saved a game instance at a desired time, then the participant may need to revert to the state of the game instance at an undesirable time such as a point in time that a last autosave was completed or a point in time that the game instance was last explicitly saved. This problem is compounded by the fact that many game instances are interrupted by factors that are unpredictable and outside of the participant's control, such as hardware failure or degradation, network outages, low battery levels, power outages, telephone calls, emails, text messages, instant messages, families, friends, pets, changes in lighting or noise level in the environment, competition for resources by other software such as scheduled updates or system scans, competition for network resources by other users on other machines, or other factors that require relocation or cause delay or postponement of the game.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 illustrates an example process for capturing inputs during gameplay.

FIG. 2 illustrates an example process for replaying inputs before beginning subsequent gameplay.

DETAILED DESCRIPTION

Figure 3:
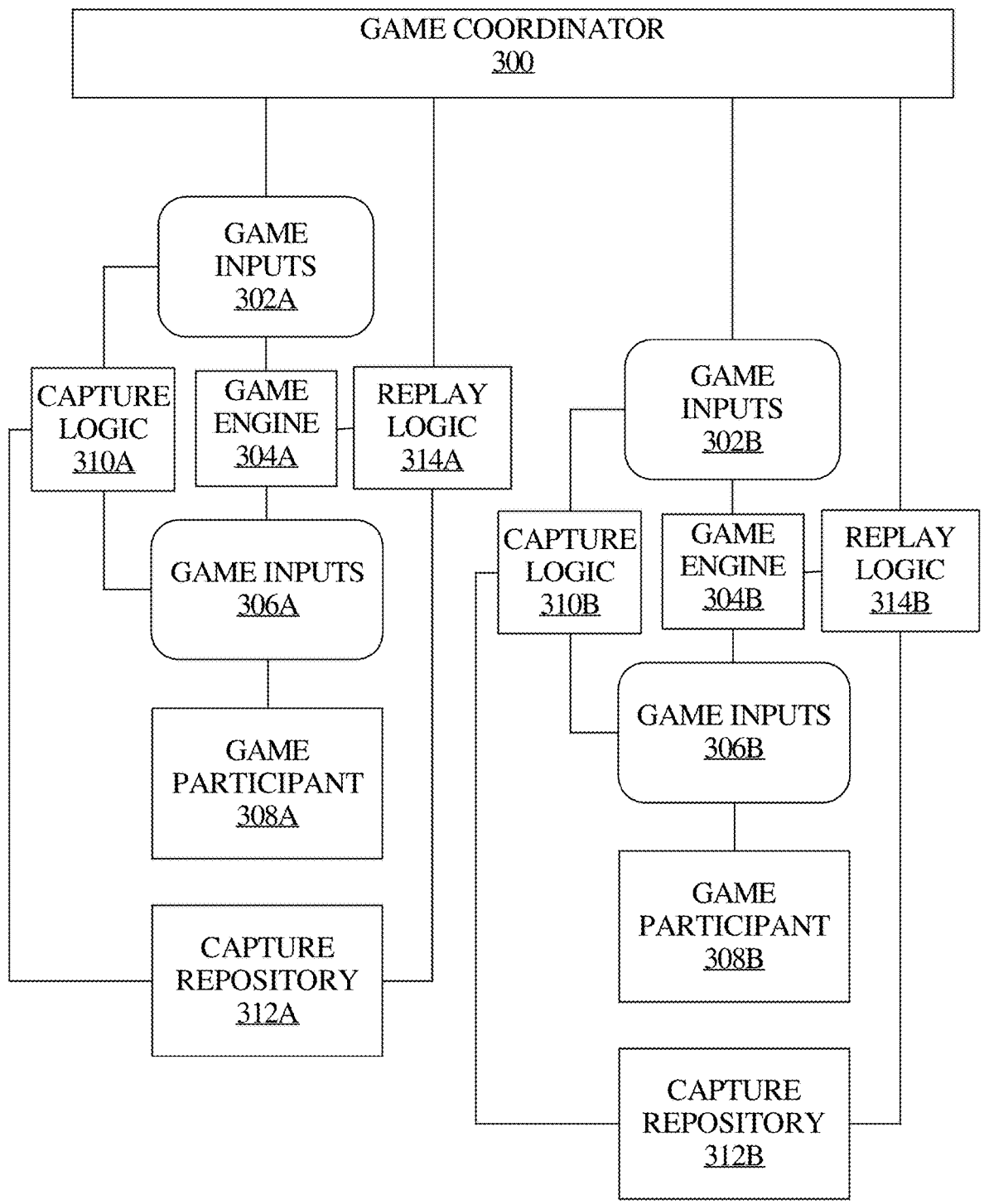
FIG. 3 illustrates an example system for capturing and replaying inputs.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for initiating gameplay of a game at a particular point (the "target point") in a previous playing of the game. The state of the game at the target point (the "target state") is reproduced by first restoring the game to a "reload state". The reload state is a state, in the previous playing of the game, that existed at a "reload point" that was before the target point. The reload point may be a point at which the map and game objects are initially generated according to game specifications to begin gameplay or a point for which states of game objects have been saved, either during the previous playing of the game or during a replay of the game. Once the reload state is restored, previously-recorded inputs that occurred between the reload point and the target point are replayed to arrive at the target state. Once the target state has been reached, a subsequent playing of the game may begin from the target state, with either the same or different players, and with either the same or different game settings.

A gameplay instance that begins at a target state of a previously-played gameplay instance is referred to herein as a "replay game". Replay games generally have two phases: a replay phase and a newplay phase. The replay phase in the phase in which captured inputs from the previously-played game are provided to the game engine to achieve the target state. The newplay phase is the phase, after the replay phase, in which participants play the game starting from the target state. Input during the newplay phase is from live action, rather than from previously-captured input.

In one embodiment, capture logic stores electronic record(s) of at least a period of past gameplay. For example, the electronic record(s) may represent an entire instance of past gameplay or a portion thereof. The electronic record(s) include captured participant inputs that occurred during the period of past gameplay. Each of the participant inputs occurred at a corresponding time during the period of past gameplay, and the captured participant inputs changed states of game objects during the period of past gameplay. A first subset of the captured participant inputs may have occurred after a reload point and before a target point, and a second subset of the captured inputs may have occurred after the reload point and after the target point.

Replay logic may then receive a request to initiate subsequent gameplay beginning from the target point in time that occurred during the period of past gameplay. The replay logic causes the subsequent gameplay to begin from the target point at least in part by performing a reloading step and a replaying step. The reloading step causes the game objects to assume states that the game objects were in at the reload point. The replaying step replays the first subset of the captured participant inputs without replaying the second subset. An amount of time that elapses between replaying each of the first subset of captured participant inputs is based, at least in part, on an amount of time that elapsed between occurrence of corresponding participant inputs during the period of past gameplay. Subsequent gameplay may begin after the reloading step and the replaying step and in response to the request.

In the same or a different embodiment, the electronic record(s) comprise saved states of game objects at a checkpoint in time during the period of past gameplay, and captured participant inputs that affected one or more of the game objects during the period of past gameplay. The states of game objects may be saved during the past gameplay or during a replay or simulation of past inputs. If states are saved during the replay, those saved states may be restored in response to a request to rewind the replay to a target state that is on or after those saved states.

The captured participant inputs comprise a first subset of inputs that occurred at times before the checkpoint, a second subset of inputs that occurred at times after the checkpoint but before a second point in time during the period of past gameplay, and a third subset of inputs that occurred at times after the second point in time. Replay logic may receive a request to initiate subsequent gameplay beginning from the second point, and, in response, cause the subsequent gameplay to begin from the second point at least in part by loading the captured states and replaying the second subset of inputs based at least in part on the times of the second subset of inputs. Replaying the first subset of captured participant inputs causes simulation of a portion of the past gameplay that is similar to or the same as the initial playing of the portion of the past gameplay.

In either embodiment, replaying the first subset of captured participant inputs simulates a portion of the past gameplay in a manner that is similar to or the same as the initial playing of the portion of the past gameplay. For example, replaying the first subset of captured participant inputs may restore game objects to same states that existed at the target point during the past gameplay.

In one embodiment, during gameplay, capture logic periodically saves states of states of game objects and other states of the game. The saved states may include unit locations, unit movements, unit health, unit kill counts or experience, researched technology, balance(s) of resource(s), and other information. Each of these saved states is a "checkpoint" that can be subsequently used as a "reload point" to reproduce a target state.

In another embodiment, replay logic periodically saves states of game objects and other states of the game as past inputs are simulated. Once saved, the replay logic may revert to these saved states to rewind the simulation to points in time that are on, near, or just after the checkpoints reflected by the saved states. The periodically saved states may be stored in an electronic record that includes captured participant inputs or in a temporary electronic record that is created to support replay or simulation of the captured participant inputs.

The capture logic also captures participant inputs that were received or executed between the periodically captured states. Captured inputs may include directives, instructions, or other decisions or selections communicated by the participant to the game engine during gameplay, or any other inputs that trigger network communications or contribute to changes in game states. The capture logic stores the captured information in electronic record(s) of period(s) of the gameplay.

After the period(s) of gameplay, the replay logic receives a request to initiate a replay game with a target point in time that occurred during a period of past gameplay. The replay logic determines which of the checkpoints should serve as the reload state. Typically, checkpoint that is selected as the reload state is the checkpoint that occurred most immediately before the target point. For example, if checkpoints occurred at times T1, T5, T10, and T15, and the target point is at time T12, then the checkpoint at time T10 would be selected to reproduce the reload state. Once the appropriate reload state is loaded, the participant inputs that were captured between time T10 and time T12 are replayed. As a result, the game is brought to the state that existed at time T12.

In one embodiment, captured participant inputs may have changed the states of the game objects during the period of past gameplay. For example, the captured participant inputs may have caused units to move, attack, hold position, build, repair, or carry out another directive such as using a special ability.

The request may cause subsequent gameplay to begin from a second point in time from the period of past gameplay. The second point of time may be after a particular checkpoint and after some of the captured inputs but before others of the captured inputs. Causing the subsequent gameplay to begin from the second point may include loading the states that were captured at the particular checkpoint. If the second point is after the particular checkpoint and after a first subset of captured inputs, causing the subsequent gameplay to begin may also include replaying the first subset of captured inputs. The captured inputs may be replayed or simulated against a game engine at similar times relative to each other to preserve timing information that was captured with the inputs. For example, the captured inputs may be replayed at an accelerated speed that is based at least in part on the time that the captured inputs were previously received or executed. The replay logic may avoid replaying any captured inputs that were received before the particular checkpoint, optionally after other checkpoints that define other periods of past gameplay. The replay logic may also avoid replaying any captured inputs that were received after the second point of time that is identified by the request.

In one embodiment, the request to begin subsequent gameplay is received before simulating one or more periods of past gameplay, and a point is selected from which to begin the subsequent gameplay as the one or more periods of past gameplay are simulated. Simulating the one or more periods of past gameplay may include reloading game states as viewers of the simulation skip or otherwise navigate to different times in the simulated past gameplay. In one example, past inputs may be replayed from a checkpoint at which state has been saved if viewers choose to navigate to a time for which state has not been saved.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Example Gameplay Restoration System

FIG. 3 illustrates an example system for capturing and replaying inputs. As shown, a game coordinator 300 coordinates game inputs 302A-B between game engines 304A-B on local systems of different game participants. For example, game coordinator 300 may send game inputs 302A to game engine 304A in response to detecting that other participants provided the game inputs 302A. Game engine 304A handles the game inputs 302A from other participants and game inputs 306A from the local game participant 308A to display game graphics to participant 308A. In one embodiment, game inputs 306A from the local game participant 308A are forwarded to game coordinator 300 before being sent back to game engine 304A and further processed. As game engine 304A displays game graphics to participant 308A, capture logic 310A captures any game inputs 302A and 306A that would be needed to replay the gameplay against game engine 304A. Capture logic 310A stores captured information in capture repository 312A.

After initial gameplay, replay logic 314A may access captured information from capture repository 312A, and replay the captured information against game engine 304A. Replay logic 314A may coordinate with other replay logic 314B via game coordinator 300 if the captured information is to be replayed synchronously for both participants 308A-B. Participants that are watching the replay may be the same or different than the participants who competed during the initial gameplay.

Capturing Inputs

The capture logic may capture inputs caused by one or more human participants and/or by one or more machine-controlled participants during period(s) of past gameplay. Captured inputs may include directives, instructions, or other decisions or selections communicated by the participant to the game engine during gameplay, or any other inputs that trigger network communications, network events, or otherwise contribute to changes in game states. The captured inputs may be more than mere mouse clicks or keypresses, but may be the commands that are executed by the game engine in response to mouse click(s) or keypress(es) at various points and various times on the game interface.

In one embodiment, at least one of the first subset of captured participant inputs is a directive, instruction, or command to game object(s). Directives may be caused by raw user inputs that are processed by a game engine or game interface that causes the directive to be carried out with respect to the game object(s). For example, a directive to a unit or character may cause the unit or character to move to a user-specified location, to attack a user-specified target or area, to hold position, to build a user-specified structure, to repair a user-specified structure or unit, or to carry out another action. As another example, a directive to a building may cause the building to build a user-specified unit, to research user-specified technology, to move to a user-specified location, or to attack a user-specified target. When carrying out the directive while replaying the first subset of the captured participant inputs, the game object(s) may have a same effect, on other game object(s) that may be concurrently carrying out other directive(s), as did the at least one game object when the directive was carried out during the period of past gameplay. For example, a directive for unit A to attack unit B during the period of past gameplay may have caused unit A to hit unit B at particular times during the period of past gameplay. During the replay or simulation of the past gameplay, unit A may hit unit B at the same relative times.

Directives that are given to game objects at different times during gameplay may cause different outcomes. For example, a unit may not be able to move to a certain location if the location is blocked by another unit. As another example, a building may not be able to build a unit if the participant does not have enough virtual currency, such as minerals, gas, silver, or gold. The outcome of a directive provided during past gameplay may be preserved when the directive is replayed. In one embodiment, replaying the directive at a same time relative to other input and relative to a replay speed achieves a same outcome when the directive was previously executed against a deterministic game engine and is replayed against the deterministic game engine.

In one embodiment, the capture logic generates the electronic record(s) at least in part by periodically capturing sets of states of game objects. The electronic record(s) may include sets of states captured at different times, and sets of captured participant inputs that occurred between the different times. Each of the captured states may be stored in association with the inputs that occurred before and/or after the captured state, or such an association may be inferred based on a timestamp of the captured state and timestamps of the captured inputs. The electronic record(s) may be stored as a collection of data that is distributed among multiple files or as a single file.

In the same or a different embodiment, the capture logic generates the electronic record(s) at least in part by capturing participants' inputs to the past gameplay. The electronic record(s) may include a time sequenced recording of every participant's inputs. The record(s) may also store other information that has no consequence on a later replay or simulation of the past gameplay. Such other information may include chat messages between players and a time sequenced list of "interesting," flagged, or bookmarked events that players might want to choose as resume points (such as when the game was paused, when a player became unresponsive, when a player dropped, and when the game ended).

Electronic Records of Past Gameplay

In one embodiment, electronic records of game instances or portions of game instances identify the human participant(s) and/or machine-controlled participant(s) that were competing in the game instance(s) when the inputs and states in the records were captured. For example, the human participants may be identified by a user identifier, a selected race, team, starting location(s), and/or other configurable or random participant-specific start conditions. The machine-controlled participants may be identified by race, overall difficulty level, type of artificial intelligence, speed, team, starting location(s), and/or other configurable or random participant-specific start conditions.

The electronic records may also identify start conditions that are not participant-specific. For example, record(s) may identify a selected map, timing constraints, pause constraints, lag constraints, game speed, and/or environment objects such as neutral characters that move around, breakable boulders, mineable minerals, gas, or trees, water, etc.

Electronic record(s) may be generated based at least in part on different portions of different instances of past gameplay. For example, assume that users engage in a first instance of gameplay from time T0 to time T10. After they have finished the first instance of gameplay, they may engage in a second instance of gameplay whose initial state is the state that existed at time T5 of the first instance of gameplay. The second instance of gameplay may span from that time, T5, to time T30. After they have finished the second instance of gameplay, they may engage in a third instance of gameplay whose initial state is the state that existed at time T22 in the second instance of gameplay or at time T8 from either the first or the second instance of gameplay. Any number of game instances may be represented in a single replay, and any number of replays may be stored together in a replay package. Each of the different instances of past gameplay may have same or different participants, same or different teams, same or different numbers of participants, and/or same or different handicaps.

In one embodiment, electronic records of past gameplay are stored as trees that are created from different and possibly overlapping instances of past gameplay. For example, a game may have been played multiple times from a given target point or from multiple target points as part of multiple past game instances. Each of these past game instances may be stored together in the same package of electronic records. Options for navigating the tree may be displayed on a replay interface as the past game instances are simulated on the replay interface. Simulated past game instances or portions thereof are referred to herein as "replays." The replay logic may display an option to the user(s) at each junction to select which branch of the replay the user(s) would like to follow. The replay logic displays video of the simulated past gameplay for the selected branch(es) of replays.

The replay logic may also label interesting points of a replay as those points in the tree that have become popular starting points and after which there are many different replays. Starting points in replay packages may be ranked based on how frequently those points are played and based on how frequently players win on different teams starting from those points. For example, starting points that result in even odds for both teams may be ranked higher than starting points that result in lopsided odds for one team over another team.

Statistics may be tracked about subsequent game instances that are based on a replay file whether or not the replay file is stored as a tree of replays. For example, a game server may track which teams won or lost a subsequent game instance that is based on a replay file, and the results may be stored in a statistics record associated with the replay file. The information in the statistics record may indicate a frequency that participants played the replay file, frequencies of different starting points within the replay file, and win percentages for team(s) at the different starting points. Starting points may be ranked or scored within a replay file, optionally weighing evenly matched starting points higher than lopsided starting points and/or optionally weighing popular starting points higher than unpopular starting points. Also, replay files may be ranked or scored based on frequency of play and win percentages, optionally weighing evenly matched replay files higher than replay files where one team wins more than other team(s) and/or optionally weighing popular starting points higher than unpopular starting points. Information about replay file rankings and/or starting point rankings may be displayed to users on an interface concurrently with an option to select a replay file and/or a starting point within a replay file.

In one embodiment, the electronic record(s) of a game instance are stored in a repository of electronic records after gameplay during the game instance. The electronic record(s) may be accessible to other candidate participants via a network. Other candidate participants may select the electronic record(s) to start a game from a point in time during the game instance represented by the electronic record(s).

In another embodiment, interesting points may be labeled by replay logic or other post-capture processing logic. In various embodiments, the capture logic, post-processing logic, or replay logic may detect and flag a time at which participant(s) in the past game instance diverged in score, in minerals, gas, trees, gold, or silver collected, in units produced or killed, or in the development of counter-technology. Examples of counter-technologies include anti-air support against air units, detection against invisible units, ranged units against ranged units, and armor-piercing units against heavily armored units. These flagged events may be detected by the replay logic and graphically indicated to the candidate participants for support the candidate participants' choice of a desirable time to begin subsequent gameplay.

FIG. 1 illustrates an example process for capturing inputs during gameplay. Example processes described herein may be implemented by computing devices. In step 100, the computing devices store starting conditions for gameplay in electronic record(s). In step 102, the computing devices receive inputs from participants during gameplay, and, in response to the inputs, in addition to triggering actions in the game, store the inputs in the electronic record(s). At particular times, the computing devices also store, in the electronic record(s), states that the game objects were in at the particular times. In the illustrated example, the computing devices flag particular events that occurred during the gameplay in step 106 before storing the electronic record(s) in an accessible repository of electronic records of gameplay in step 108. The illustrated steps may be performed in any order as long as any information required to perform the step can be determined.

Replaying Past Inputs

During the replay phase of a replay game, replay logic may replay past inputs with or without displaying the replay of such inputs to participants. In one embodiment, participants may select to start a new game from a point in a simulated past game instance or replay by selecting a replay file comprising electronic record(s) of the past game instance, and by specifying the point in time. For example, participant A selects to create a new game instance from a replay of a past game instance between participants B and C, and participant A may specify that the new game instance should start 15 minutes into the replay or some other time relative to the beginning of the replay. Thus, 15 minutes into the past game instance is the target point for the replay game. In other examples, the start time may be relative to a total time of the replay, relative to an ending of the replay, or relative to a flagged event that occurred during the replay. Flagged events may include times at which participant(s) in the past game instance diverged in score, in the rate of input, or in minerals, gas, trees, gold, or silver collected, and/or in units produced or killed. The participant of the new game instance may be joined in a virtual waiting room by other participants of the new game instance, and the new game instance may begin when all participants of the new game instance are together.

Before the new game instance begins, the replay logic may put the game in a reload state by loading a game state from the electronic record(s) of the past game instance. If there is no game state that was captured at exactly the target point, then the new game state is generated by loading the game state that is nearest overall, nearest before, or nearest after the target point. If a game state before the target point is selected, then the replay logic may replay some past inputs from past participants of the past game instance. The replayed past inputs are those inputs that occurred, in the past game instance, between the loaded game state (the reload point) and the target point. If the past inputs are replayed against a game engine that is deterministic, then the past inputs will produce a same state each time they are replayed, and this same state matches the state that existed at target point in the past game instance.

In games that are based on real-time input, gaps between pairs of consecutive inputs may affect the outcome of the inputs. For example, a first input may direct a unit to move, and a second input may direct a unit to hold a position or attack. In the example, the unit may have moved a distance that varies based on a length of a time gap between the two inputs. If the relative length of the time gap is not preserved during replay, then the unit may end up holding a different position or starting an attack from a different position. In a complex game, gaps of different lengths of time occur between different pairs of consecutive inputs from a single participant, and these differences in the lengths of time affect outcomes of the different pairs of consecutive inputs. For example, in a real-time strategy game, human participant(s)

may freely provide as many or as few inputs as desired, as frequently or infrequently as desired, during a game instance.

The relative length of a past time gap may be preserved by replaying the input at the same speed that the input was executed during the past gameplay, or by scaling both the speed of the inputs and the speed that the game progresses during replay. For example, the inputs could be replayed at faster speeds than they were previously executed if, during replay, units moved and attacked faster and buildings built and researched faster than in past gameplay. Similarly, the replay could be performed at speeds that are slower than the past gameplay.

In one embodiment, replay logic may be configured to advance simulated game time as quickly as the replay logic can process captured inputs, which may vary based on the computer resources (i.e., memory and processor time) that are available to the replay logic. For example, a game time such as a timestamp may be part of the input to the replay logic, and the replay logic may compute a result of the input based at least in part on the game time that the input occurred.

In one embodiment, replay of past inputs is stopped (i.e. the replay phase is completed) before the newplay phase begins, in which receipt of new inputs from new participants is allowed. If the replay is displayed to new participants on a replay interface, the new participants may change views of the replay but may not perform actions that form a part of the gameplay or otherwise change the state of the objects that are being replayed. After the replay phase has finished and the newplay phase begins, the new participants may not only change views of the gameplay but may also perform actions that form a part of the gameplay. These actions may change the state of the objects during the gameplay. For example, after subsequent gameplay begins, participants may move, attack, or build by controlling units.

FIG. 2 illustrates an example process for replaying inputs before beginning subsequent gameplay. Computing devices performing the example process start in step 200 by accessing electronic record(s) that includes captured participant inputs received during past gameplay and captured states of game objects at particular times during past gameplay. In step 202, the computing devices load at least one of the captured states from the electronic record(s). Then, in step 204, the computing devices simulate gameplay based on the captured participant inputs that were received during past gameplay, optionally displaying the simulated gameplay to candidate participants that may participate in subsequent gameplay. The simulation may also be shown to candidate observers that may watch the subsequent gameplay. In step 206, the computing devices customize game settings and game objects according to preferences of candidate participants of the subsequent gameplay. Finally, in step 208, subsequent gameplay begins where the candidate participants become participants that can manipulate game objects to affect the game state during the subsequent gameplay.

Rolling Back from a Reload State

In the examples given above, the target state was achieved by loading a reload state that occurred before the target state in a previously-played game instance, and then resending previously-recorded user input to the game engine. However, in some embodiments, the target state may be recreated by loading a reload state that occurred after that target state, and then undoing changes made by previously-recorded user input. For example, past inputs may be replayed or simulated against game engines that allow inputs to be undone. The game engine may also support undo operations during the initial gameplay.

For example, if a game state after the requested time is selected, the replay logic may undo some past inputs from past participants of the past game instance. The undone past inputs are those inputs that occurred, in the past game instance, between the loaded game state and the requested time. Inputs that occurred immediately before the requested time, having little or no chance of interacting with other prior inputs, may be undone without further information. On the other hand, information about inputs that occurred prior to the requested time may be used to undo inputs that occurred further before the requested time.

Handling Non-Deterministic Events within Games

In one embodiment, if the game engine is not completely deterministic, variables may be captured and replayed with the past inputs to produce a same outcome. For example, a given input may produce a result based on randomly generated variable(s). Rather than regenerating the random variable(s) during replay of the input, the capture logic may capture these randomly generated variable(s) during the past gameplay. The variable(s) may be stored in the electronic record(s) of the past gameplay. Then, the replay logic may use or substitute the captured variable(s) as the randomly generated variable(s) when replaying the past input from the electronic record(s) of past gameplay.

In one embodiment, capture logic detects the occurrence of a randomized event as a result of captured participant input(s) during the period of past gameplay, and, in response, stores variable(s) that represent the randomized event in electronic record(s) of the period of past gameplay. Replay logic may then use the stored variable(s) to replicate the randomized event while replaying the captured participant input(s).

Automatically Generated Game Bookmarks

In one embodiment, the capture logic detects a change in a rate at which participant input is provided by a particular participant during a period of gameplay and, in response to detecting the change, the capture logic flags a time of the change in the electronic record(s). For example, a participant may be performing approximately 60 clicks or keypresses per minute, corresponding to approximately 30 directives to units per minute for a first 10 minutes of gameplay. After 10 minutes of gameplay, the participant may slow down to 10 clicks or keypresses per minute corresponding to approximately 4 directives to units per minute for a next 5 minutes of gameplay. In the example, the participant may have received a phone call and attempted to keep playing the game rather than pausing the game. Such activity may be detected and flagged so that the 10 minute mark of this initial gameplay may be identified as a point of interest for starting subsequent gameplay.

In another example, the rate may change when participant input ceases for a period of time. Bookmarks may be created to designate a beginning of a time period during which the participant input ceased. Such bookmarks may be indicative of keyboard failures, mouse failures, network device failures, or other circumstances that prevented the participant from providing input.

Replay Interface

A replay interface may cause display of information about multiple past game instances along with graphical option(s)

to begin a new game instance that starts from a point during one of the past game instances. Multiple electronic records of past game instances, such as replay files, may be automatically or manually uploaded to one or more centralized, networked replay repositories after gameplay during the past game instances. These electronic records may also be stored locally. The electronic records may be shared via a sharing or messaging system in which messages include the electronic records as attachments or links to download the electronic records. Upon selection of a replay file, the replay file may be downloaded if the file is not already stored on the participant's machine.

Figure 4:
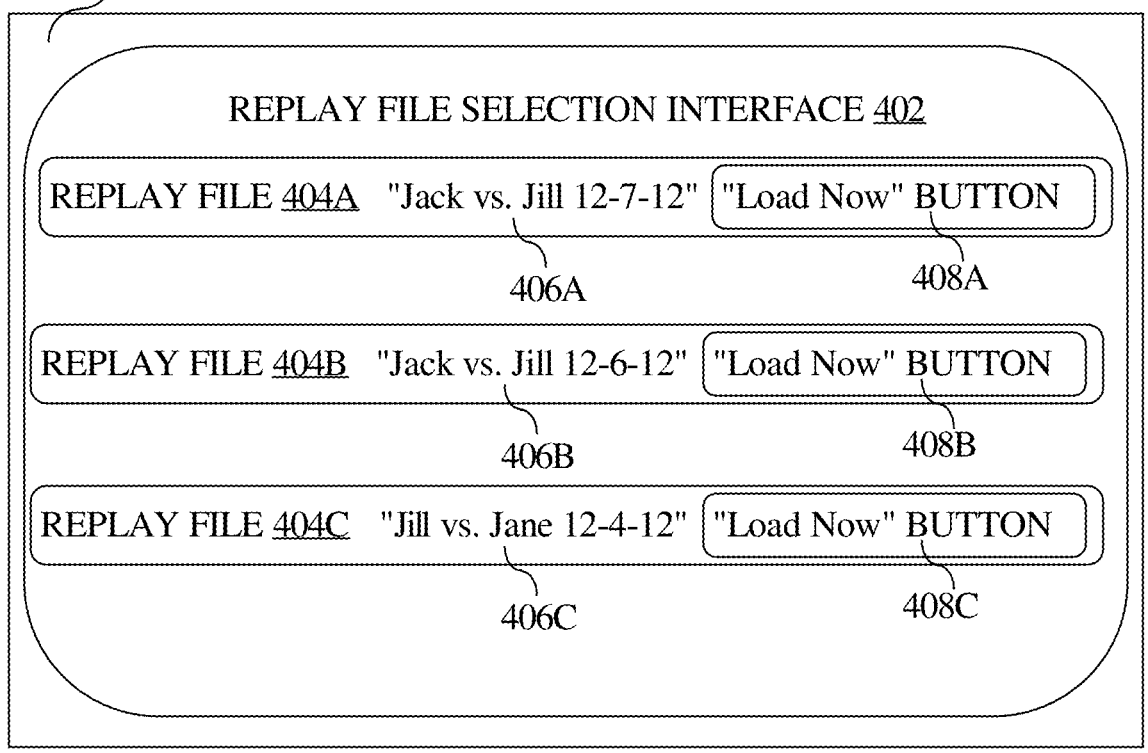
FIG. 4 illustrates an example interface for selecting to simulate or replay a portion of an instance of a past game.

FIG. 4 illustrates an example interface for selecting to replay an instance of a past game. As shown, a replay file selection interface 402 is shown on display 400. The replay file selection interface presents three options: replay file 404A, replay file 404B, and replay file 404C. A user may select one of the replay files to load and replay by selecting a button such as the respective "Load Now" button 408A, B, or C. As shown, each replay file includes some descriptive information 406A-C. The descriptive information may provide information such as the names of the participants who competed in the gameplay (shown), the map or virtual world in which the gameplay was conducted, the length of the gameplay, a rating of the gameplay by other users, and/or the date of the gameplay (shown).

Others may be invited to participate in or observe subsequent gameplay that begins from a target point during replay of past gameplay. The others may be invited by party, channel, as friends, or via a player finder that automatically locates other players of similar skill that are currently interested in similar types of games. When participant(s) for subsequent gameplay have joined and downloaded a replay file, the replay may be played on machines of the participant(s). The target point for a replay game may be specified before display of part or all of a replay of any of the past game instances, or the target point may be specified during or after display of the replay.

In one embodiment, the replay interface causes display of information about past game instance(s) represented by electronic record(s), and causes display of an option for candidate participant(s) of a new game instance to select a point from the past game instance(s) from which the new game instance should begin. For example, the replay interface may cause display of a timeline, and a replay of the past game instance(s) may be played on a map, view, or video above the timeline.

Candidate participant(s) and/or candidate observer(s) may watch the replay of the past game instance(s) as the past game instance(s) progress according to a progress bar on the timeline or some other time indication. Candidate participants may, after the replay phase, become participants that provide directives to game objects and otherwise participate in the subsequent gameplay when the subsequent gameplay begins. The game objects may change states as the game objects carry out the directives provided by the participants. Candidate observers may, after the replay phase, become observers that are prevented from providing directives or otherwise participating in the subsequent gameplay when the subsequent gameplay begins. Candidate observers and candidate participants may both view the replay and may both have views of the subsequent gameplay.

In one embodiment, during the replay phase, a displayed replay may also be interacted with to change views. Different viewers may utilize the replay interface to zoom in on certain areas of the map, or toggle which of the past participants' units or visibility zones are viewable on the map. A visibility zone is an area of a map that is viewable to a participant during gameplay. Displaying different visibility zones that corresponds to different participants allows viewers of the replay to visualize what the past participants could have known at a given point during the replay. The zoom feature allows viewers to focus in on key battles that occurred during the past gameplay. Areas may be zoomed into for focus by the viewers at particular times during replay even if those areas were not being viewed by the past participants at those particular times during the past gameplay.

In one embodiment, a viewer of a replay is restricted to a visibility zone of a specific participant or team of the past gameplay. The visibility zone may be restricted based on which a role or team associated with the viewer. For example, the viewer may have indicated that the viewer plans to become a participant of a particular team in subsequent gameplay. The particular team may have had limited visibility during the past gameplay. During replay, viewers that belong to the particular team may share visibility of particular regions of a map; whereas, viewers of another team may share visibility of different regions of the map. Visibility for different teams may be non-overlapping, overlapping, similar, or even the same.

During the replay, viewers may also see which units are being selected as they are selected. For example, dotted lines of different colors may be drawn around units that were selected by different participants during the past gameplay, even if the different participants did not direct those units. The dotted lines allow viewers of the replay to visualize what clicks were needed to provide directives to accomplish the actions that were accomplished during the past gameplay.

The replay of the past game instance(s) may cover one or more periods of past gameplay that correspond to one or more checkpoints of state that were captured during the past game instances. During the replay, the candidate participant(s) and/or candidate observer(s) may move the progress bar to a point on the timeline, and, in response, the replay logic may begin replaying from the point rather than replaying the past game instance(s) from start to finish exactly how the past game instance(s) were originally played. Alternatively, viewers of the replay may select an option to skip forwards or backwards in the replay. The skip may advance the replay to a later checkpoint, or rewind the replay to an earlier checkpoint in a manner similar to skipping between chapters on a DVD.

If, during the replay phase, the progress of the replay is moved to a new point that does not correspond to a checkpoint, whether by selecting options to skip or by dragging the progress bar, then the replay logic may replay past inputs from a checkpoint that is just prior to the new point, up to the inputs received on or before the new point. Alternatively, if the new point is just prior to a later checkpoint, the replay logic may undo inputs received between the later checkpoint and the new point.

In one embodiment, the replay interface includes graphically indicated option(s) which, when selected, cause changing a speed that the replay progresses. For example, the replay interface may include an option for speeding up the replay of the past game instance by proceeding at double speed (2×), 4× speed, 8× speed, 16× speed, or even 32× speed. As another example, the replay interface may include an option for slowing down the replay of the past game instance by proceeding at half speed (½×), ¼×, ⅛×, ¹⁄₁₆×, or even ¹⁄₃₂×.

In one embodiment, the replay interface displays a replay of one or more periods of past gameplay during which visibility of the one or more candidate participants is limited based on an association between the one or more candidate participants and a particular team. For example, the one or more candidate participants may be assigned to or otherwise belong to a particular team of two or more teams that will compete in the subsequent gameplayPast gameplay may have also occurred between past participants on the two or more teams. During the past gameplay, visibility of one or more of the past participants may have also been limited based on the particular team to which the one or more past participants belonged. In this manner, team visibility may be preserved among candidate participants during replay in a same manner that team visibility limited past participants of past gameplay.

In one embodiment, the replay logic detects that the electronic record(s) have flagged event(s), and causes display, on the replay interface, a graphical indication of the flagged event(s). For example, the flagged event(s) may be marked as hashmarks on a timeline. The marks may be color-coded to indicate their type and/or may have a mouse-over function that indicates further information about the mark when the mouse or other candidate participant input hovers over the mark.

In one embodiment, the replay logic synchronizes replay of the period(s) of past gameplay across multiple replay interface clients, each of which causes display of a replay interface to a candidate participant or candidate observer. The synchronized replay may be controlled by an administrator of the instance of subsequent gameplay, who may also be a creator of, a candidate participant of, or a candidate observer of the instance of subsequent gameplay. The administrator may invite candidate participant(s) and/or observer(s) to join the instance of subsequent gameplay, and/or the administrator may publish the instance of subsequent gameplay in a manner that allows others to freely join the instance of subsequent gameplay. The administrator may control a speed of the replay, skipping functionalities or other functionalities of the replay interface, and a selection of a particular time in which the instance of subsequent gameplay should begin.

In other embodiments, even if the replay is synchronized among multiple replay interface clients, control of the replay may be distributed among a subset of or all of the replay clients. In other words, the replay may be sped up for all participants when one participant selects to speed up the replay, or the replay may skip to a point when one participant selects to skip to the point.

The point at which the subsequent gameplay should start (the target point) may also be selected by one, a subset of, or all of the participants or observers of the replay game. If multiple participants or observers are involved in selection of the target point for a replay game, then single participants or observers may vote on candidate target points. Upon receiving selection of a candidate target point from a participant or observer, a replay interface client may forward the selected candidate target point to other participant(s) or observer(s). Other participants or observers may approve one or multiple target points as acceptable. A first candidate target point that has been approved by all or a specified subset of the candidate participants or observers may become the actual target point for the replay game.

In one embodiment, each replay interface client may separately control progress of the replay without synchronization among the replay interface clients. The candidate participant(s) and/or candidate observer(s) may be informed of a timed review period during which the candidate participant(s) and/or candidate observer(s) may freely view the replay and focus on different portions. In another embodiment, candidates may indicate that they are ready to proceed with the subsequent game at any time, and the subsequent game may proceed shortly after the last candidate indicates that he or she is ready to proceed. In yet another embodiment, candidates may be automatically alerted when they have reached a point at which subsequent gameplay will proceed and whether or not the other candidates have reached that point. Gameplay may automatically resume after all candidates have reached the point. Alternatively, an administrator may announce that the subsequent game will start at a specified time, such as by unilaterally initiating a countdown to start the game.

In another embodiment, replay interface clients for candidate participants on a same team are synchronized such that the candidate participants may review the replay together and discuss strategy via electronic voice communications or electronic text messages. Such communications or messages may be limited to candidates on the same team, may be sent to specific candidates, and/or may be sent to all candidates. In this manner, opposing teams may communicate with each other about whether or not the opposing team is ready to proceed, and teams may communicate internally regarding a strategy for the subsequent gameplay.

Figure 5:
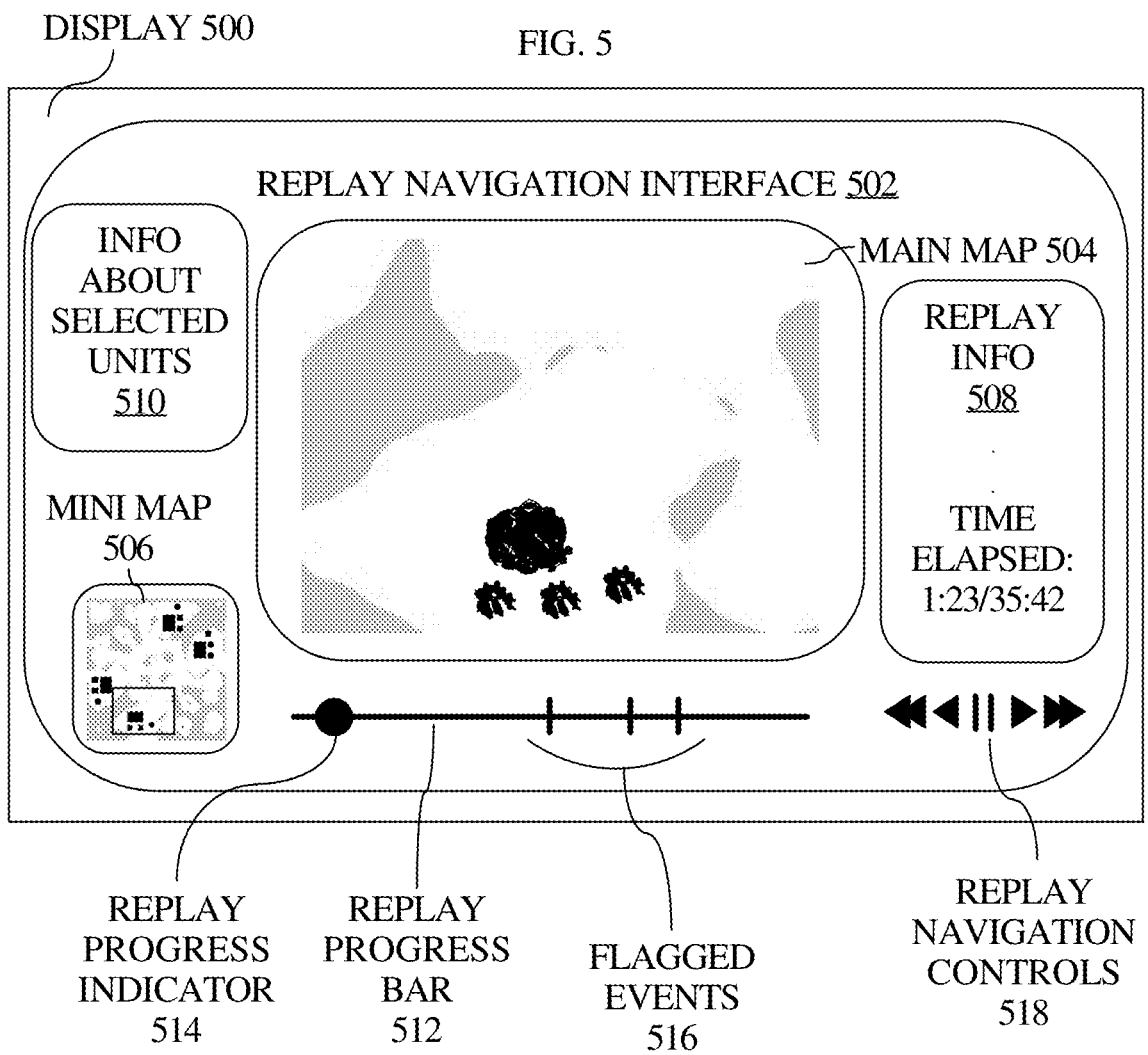
FIG. 5 illustrates an example replay interface for navigating a replay.

FIG. 5 illustrates an example replay interface for navigating a replay. As shown, replay navigation interface 502 includes a main map 504 that displays at least part of an overall map or virtual world in which the initial gameplay was conducted. As shown, game objects that were in that part of the map during the initial gameplay may be displayed on the main map 504. In the illustrated example, the larger object on the map is an example building, and the smaller objects are example units.

The replay navigation interface 502 also includes a mini map 506 for easily viewing other parts of the overall map or virtual world in which the initial gameplay was conducted. In addition to or as an alternative to the mini map, other interfaces may be provided to change the view of the overall map. As shown, the mini map includes a view finder that displays which portion of the overall map is shown on the main map 504. The portion within the view finder is zoomed on the main map 504, which is of a larger size than the mini map 506. The mini map 506 may also show units and buildings as colored rectangles that correspond to a color assigned to a participant that is responsible for the units and buildings. The varying colors are not shown in the black-and-white example.

The replay navigation interface may also include replay information 508 and/or information about selected units 510. During the replay, the viewer may select units on the screen and see, in the region for information about selected units 510, the units latest directive, how many other units that unit has killed, an amount of health or shields that remain for the unit, or any other desired unit-specific information. The replay information region 508 displays information about a progress of the replay, such as an amount of time that has elapsed, a total time of the replay, and a speed of the replay. In the illustrated example, just over a minute has elapsed in a replay that is over 35 minutes long. The replay info region 508 may also include an option that shows a time that has been selected by participant(s) for beginning subsequent gameplay. Users may select a time by clicking on the replay progress bar 512 or by manually typing in a particular time.

The replay progress bar 512 is a timeline that represents the replay. The progress is of the replay is indicated by replay progress indicator 514 on the replay progress bar 512. The replay progress indicator 514 may also be dragged from side to side to skip to particular times during the replay. The replay progress bar 512 may also include flagged events 516 that may be interesting points in time for beginning subsequent gameplay. In the example, three flagged events 516 are shown, which may correspond to times of high changes in rates of user input, times of significant production of or loss of units, or other significant events that occurred during the game. As shown, the flags correspond to single points on the timeline. However, flags could also correspond to ranges during the timeline. Such flags may be indicated by shaded regions of the timeline. The flags may have an onmouseover feature such that, when a mouse hovers over the flags, the replay navigation interface 502 displays information about why that point or region was flagged. Such information may be displayed in an overlaid window or in one of the other designated regions 508-510 for displaying information.

As shown, replay navigation interface 502 also includes replay navigation controls 518 for skipping forwards or backwards (indicated by double arrows), for increasing or decreasing the replay speed (indicated by single arrows), and/or for pausing the replay (indicated by parallel lines). The navigation controls 518 provide another mechanism for navigating to the desired point(s) in the replay, and for determining where to begin subsequent gameplay.

Customizations to Subsequent Gameplay

In one embodiment, users may change various settings or game objects before the newplay phase of a replay game begins. In one embodiment, the replay interface causes display of an option to swap human participants for machine-controlled participants and vice versa, or human participants for other human participants, or machine-controlled participants for other machine-controlled participants. For example, the captured participant inputs may include inputs caused by a human participant, and a machine-controlled participant may be substituted for the human participant before completing the step of causing the subsequent gameplay to begin from the second point. In another example, the captured participant inputs may include inputs caused by a machine-controlled participant, and a human participant may be substituted for the machine-controlled participant before completing the step of causing the subsequent gameplay to begin from the second point.

In another embodiment, teams may be changed before subsequent gameplay begins. For example, teams of the past gameplay may have placed three participants on one team and five participants on an opposing team. Candidate participants of the subsequent gameplay may decide that teams should be even at four participants versus four participants or that two of the candidate participants should be on the one team and five of the candidate participants should be on the opposing team, for example, if one participant is to drop out of the match. The candidate participants may select an option on the replay interface to change the teams for the newplay phase of the replay game.

As teams and participants are reconfigured for subsequent gameplay, human participant(s) may be added to or removed from gameplay, and machine-controlled participant(s) may be added to or removed from gameplay. If human participant(s) are added to a team for subsequent gameplay, the replay logic may grant control of new units to the added human participant(s), and the new units may be placed in an unused starting location. Alternatively, the replay logic may grant, to the added human participant(s), shared control over units that were previously controlled by other human participant(s) on the team. In other words, five people may participate on a team even though the past gameplay was started with only four sets of units or armies for that team. In the example, the added person may share control over units with some or all of the other participants on the team. Machine-controlled participants may also be given shared control or exclusive control over a set of units to accommodate added players.

If human participant(s) are removed from a team for subsequent gameplay, the replay logic may grant control over the removed human participant(s) units to other human participant(s), such as human participant(s) on the same team. Machine-controlled participants may also be given shared control or exclusive control over a set of units to accommodate removed players. Alternatively, armies of removed participants may become neutral or may become part of a new team that opposes all other teams. In yet another embodiment, game objects of removed participants may be phased out of existence at the starting point after replay.

Other modifications may also be made to the game objects or settings before beginning the subsequent gameplay. For example, game objects may be added or removed from gameplay. In one embodiment, added game objects are phased into existence at the starting point after replay, and removed game objects are phased out of existence at the starting point. Added objects may be neutral or may be placed under control of specific participant(s) or shared control among a set of participant(s). In another example, objects may be removed from gameplay evenly among several participants of the subsequent gameplay or in a manner that favors particular participant(s) over other participant(s) of the subsequent gameplay.

In another example, resources to be spent by a particular participant or shared among a set of participant(s) may be added before beginning the subsequent gameplay. The added minerals may be distributed evenly among several participants of the subsequent gameplay or in a manner that favors particular participant(s) over other participant(s) of the subsequent gameplay. The minerals might not have existed in the past gameplay. Alternatively, existing minerals may be taken from participant(s) for distribution to other participant(s). In one embodiment, environment minerals that have been partially or fully mined are repopulated for subsequent gameplay.

In yet another example, game objects to be controlled by participant(s) during subsequent gameplay may be strengthened or weakened before beginning the subsequent gameplay. The strengthening or weakening of game objects may equally affect a set of participant(s) of the subsequent gameplay or may favor particular participant(s) over other participant(s) of the subsequent gameplay.

Other settings may also be changed for the subsequent gameplay according to the participants' preferences. For example, team colors may be changed, graphics settings may be changed, and/or lighting may be changed.

Figure 6:
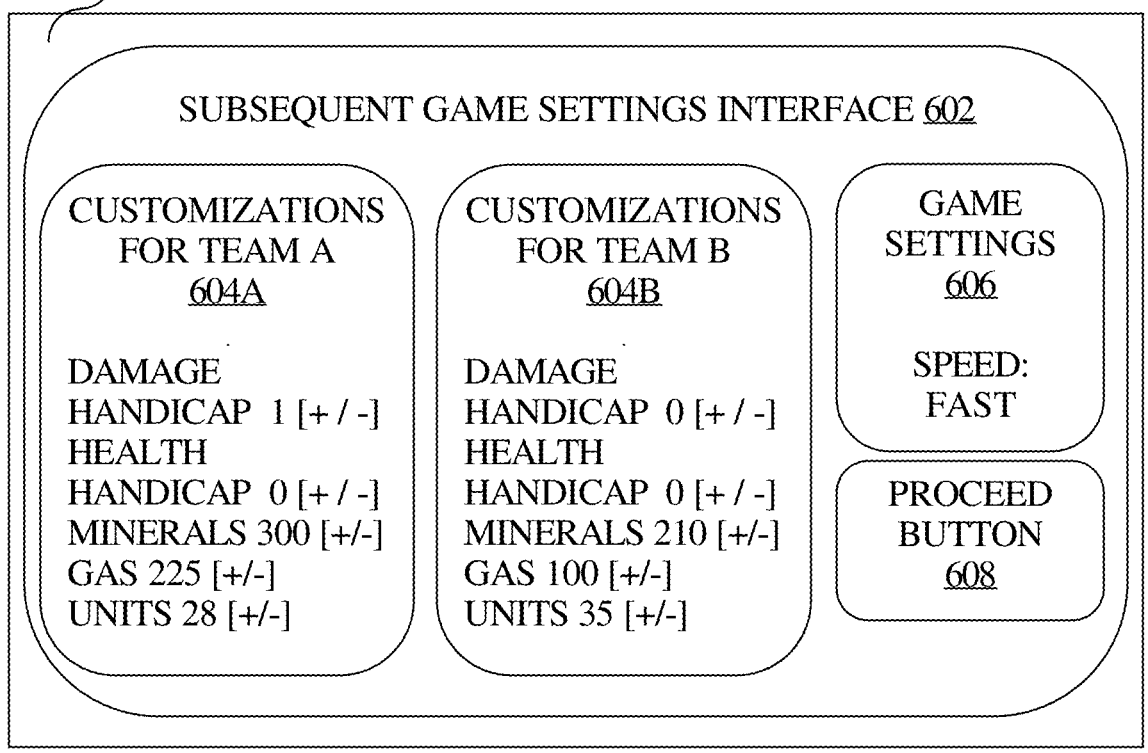
FIG. 6 illustrates an example interface for changing game settings before beginning subsequent gameplay.

FIG. 6 illustrates an example interface for changing game settings before beginning subsequent gameplay. As shown, subsequent game settings interface 602 includes options 604A for customizing settings for team A, options 604B for customizing settings for team B, and game settings 606 that apply to all teams. Example team-specific customizations may include damage or health handicaps, the addition or removal of minerals, gas, or other forms of currency, the addition or removal of units, and/or other changes that may affect the balance of gameplay between the teams. Game settings 606 may include game speed, rules that apply to the game such as number of pauses allowed and an amount of lag that is tolerated, and any other change that could affect gameplay for both teams. After a participant, who may or may not be the creator of the instance of the game, has customized the game settings, the participant may select the proceed button 608 to either proceed with the replay or, if the replay has already occurred, proceed with the subsequent gameplay from a selected point.

Flashbacks During Gameplay

In one embodiment, gameplay may be rolled back during the gameplay. For example, a game object may cause a state of the gameplay to revert to an earlier state of the gameplay. For example, before a time bomb is triggered, a game instance may have been in progress 15 minutes. The time bomb, when triggered, may cause the state of the game instance to revert to a state that existed when the game instance had been in progress for only 12 minutes. In one embodiment, to prevent time bombs from being built and set off in a continuous pattern, a time bomb may cause a depletion of minerals from participant(s) who set the time bomb. The depletion of minerals may trigger at the earlier point after the time bomb caused the game instance to revert to the earlier point. In another embodiment, to prevent time bombs from being built and set off in a continuous pattern, a time bomb may trigger a global indication that prevents time bombs from being set for a specified amount of time or even at all for the remainder of a game instance. For example, a time bomb that causes a 3 minute setback may also trigger a 6 minute timeout period, effective after the setback, during which no time bombs may be used. In the example, the timeout period is longer than the setback caused by the time bomb.

Other game objects may have effects that are similar to a time bomb. For example, a time traveler unit may be able to travel back in time to an earlier state in the game. A portal may be open at certain points during the game to allow participants an option of traveling back in time by walking through the portal. These objects may similarly be constrained with depletions of minerals and/or timeout periods that are effective after the time traveling occurs.

In order to flash back in time, the game engine may load a previous state of the game instance that had already been captured in electronic record(s) of the game instance. If the flashback point is not a point at which state was saved, then a nearby state may be loaded. If the nearby state is before the flashback point, the flashback point may be restored by replaying inputs that were captured after the nearby state up to the flashback point. If the nearby state is after the flashback point, the flashback point may be restored by undoing inputs that were captured before the nearby state back to the flashback point.

Example Embodiments for Different Types of Games

In one embodiment, game states and participant inputs are captured during an instance of a real-time strategy game between a first team of participant(s) and a second team of participant(s). The captured state may include unit and building position(s), health, energy, directive(s) that the unit(s) or building(s) are currently carrying out at a particular time during an instance of the real-time strategy game, progress towards producing building(s) or unit(s), minerals mined, and research completed or partially completed. The participant input may include new directive(s) for unit(s) or building(s) to move, attack, build, hold position, or perform some other special ability. The participants may or may not complete the instance of the real-time strategy game. For example, participants may leave the instance before any team has destroyed all of the buildings of the other team.

After an initial playing of the instance of the real-time strategy game, same or different participants may create, using a replay interface, a new instance of the real-time strategy game to be played based on the initial playing of the instance of the real-time strategy game. The new instance may be created based on a replay record, which is selected by the participants of the new instance, of the initial playing of the instance of the real-time strategy game. The replay interface may or may not cause display, to the participants, of part or all of the replay of the gameplay that occurred in the past game instance before beginning subsequent gameplay in the new instance. The replay logic may skip portion(s) of the replay by loading a captured state and replaying inputs that occurred after the captured state. The participants of the new instance may select, using the replay interface, a time at which to cut off input from the past game instance and begin providing new input for subsequent gameplay in the new instance.

When the replay reaches the selected time, replay logic may cause subsequent gameplay to begin in the new instance at least in part by enabling the participants to provide input. During the subsequent gameplay, participants may control units and compete to win the new instance of the real-time strategy game as if the past instance of the game had been paused at the selected point and resumed in the new instance of the game.

In one embodiment, game states and participant inputs are captured during an instance of a roleplaying game by participant(s). The captured state may include position(s) of character(s), health, mana, skills, level(s) of character(s), item(s), directive(s) that the character(s) are currently carrying out at a particular time during an instance of the real-time strategy game, and environment object(s), health and position(s) of monster(s). The participant input may include new directive(s) for character(s) to move, attack, hold position, or perform some other special ability. The participant(s) may or may not complete dungeon(s) or other quest(s) in the instance of the roleplaying game. For example, participant(s) may leave the instance before the participant(s) have killed all of the monsters in a dungeon.

After an initial playing of the instance of the roleplaying game, the same or different participants may create, using a replay interface, a new instance of the roleplaying game to be played based on the initial playing of the instance of the roleplaying game. The new instance may be created based on a replay record, which is selected by the participants of the new instance, of the initial playing of the instance of the roleplaying game. During the replay phase, the replay interface may or may not cause display, to the participants, of part or all of the replay of the gameplay that occurred in the past game instance. The replay logic may skip portion(s) of the replay by loading a captured state and replaying inputs that occurred after the captured state. The participants of the new instance may select, using the replay interface, a target time at which to cut off input from the past game instance and begin the newplay phase by providing new input for subsequent gameplay in the new instance.

When the replay reaches the target time, replay logic may cause subsequent gameplay to begin in the new instance at least in part by enabling the participants to provide input. During the subsequent gameplay, participants may control character(s) to complete dungeon(s) and quest(s) in the new instance of the roleplaying game as if the past instance of the game had been paused at the selected point and resumed in the new instance of the game.

In one embodiment, game states and participant inputs are captured during an instance of a turn-based game by participant(s). The captured state may include position(s) and characteristic(s) of game object(s) and the game environment at a particular turn during an instance of the turn-based game. The participant input may include new move(s) or action(s) by participant(s) using game object(s). The participant(s) may or may not complete the initial instance of the turn-based game. For example, participant(s) may leave the instance before any of the participant(s) have been declared a winner.

After an initial playing of the instance of the turn-based game, same or different participants may create, using a replay interface, a new instance of the turn-based game to be played based on the initial playing of the instance of the turn-based game. The new instance may be created based on a replay record, which is selected by the participants of the new instance, of the initial playing of the instance of the turn-based game. The replay interface may or may not cause display, to the participants, of part or all of the replay of the gameplay that occurred in the past game instance before beginning subsequent gameplay in the new instance. The replay logic may skip portion(s) of the replay by loading a captured state and replaying inputs that occurred after the captured state. The participants of the new instance may select, using the replay interface, a time at which to cut off input from the past game instance and begin providing new input for subsequent gameplay in the new instance.

When the replay reaches the selected time, replay logic may cause subsequent gameplay to begin in the new instance at least in part by enabling the participants to provide input. During the subsequent gameplay, participants may control game object(s) in the new instance of the turn-based game as if the past instance of the game had been paused at the selected point and resumed in the new instance of the game.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
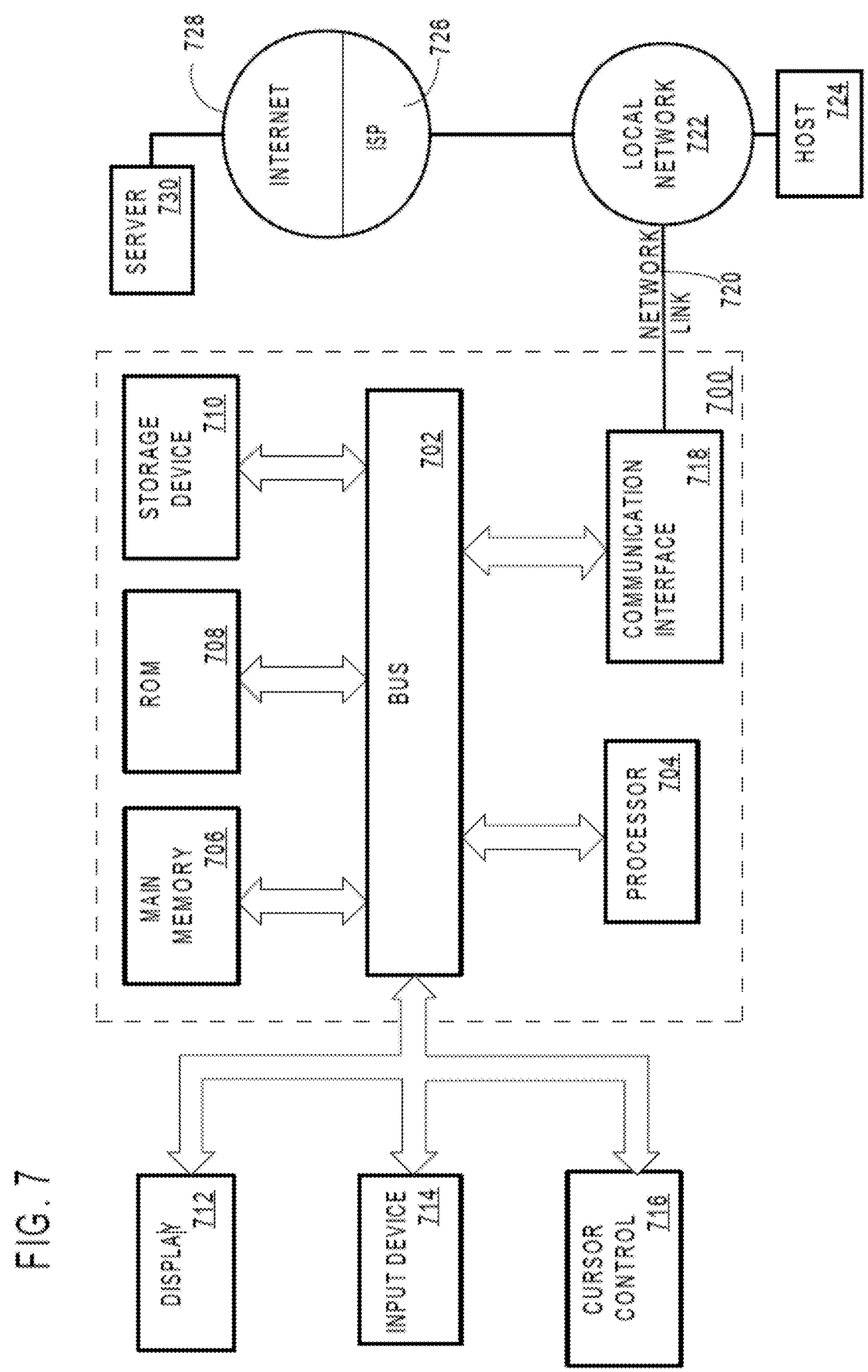
FIG. 7 illustrates an example computer system by which various techniques described herein may be performed.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   during a period of gameplay of a game by one or more participants, capturing inputs received from the one or more participants;
   generating and storing one or more electronic records of the gameplay comprising the captured participant inputs and one or more game states;
   wherein each game state of the one or more game states correspond to a respective point in time during the period of gameplay;
   wherein each of the captured participant inputs were captured at a corresponding time during the period of gameplay;
   receiving a request to initiate subsequent gameplay from a target point in time that occurred during the period of gameplay;
   causing the subsequent gameplay to begin executing on at least one computing device from the target point in time by:
      loading a particular game state of the one or more game states, the particular game state corresponding to a particular point in time that is near the target point in time;
      identifying a subset of captured participant inputs that were captured between the particular point in time and the target point in time;
      determining that the particular point in time is before the target point in time;
      in response to determining that the particular point in time is before the target point in time, replaying the subset of captured participant inputs.

2. The method of claim 1 further comprising flagging one or more points in time in the one or more electronic records, and causing display of a replay interface that graphically marks the one or more flagged points in time on a timeline that represents at least the period of gameplay.

3. The method of claim 2 wherein flagging the one or more points in time includes detecting a change in a rate at which participant input is provided by a particular participant during the period of gameplay and, in response to detecting the change, flagging a time of the change in the one or more electronic records.

4. The method of claim 2 wherein flagging the one or more points in time includes detecting pausing of the game during the period of gameplay and, in response to detecting pausing of the game, flagging a time of pausing of the game in the one or more electronic records.

5. The method of claim 2 wherein flagging the one or more points in time includes detecting a change in a number of participants during the period of gameplay and, in response to detecting the change, flagging a time of the change in the one or more electronic records.

6. The method of claim 2 wherein flagging the one or more points in time includes detecting a divergence in one or more of: score, resource collection, unit production, unit death, or technology production between two or more participants and, in response to detecting the divergence, flagging a time of the divergence in the one or more electronic records.

7. The method of claim 1 wherein the request is generated during gameplay of the game by the one or more participants.

8. The method of claim 7 wherein the request is generated, at least in part, in response to detecting a particular event in the game.

9. The method of claim 7 wherein the request is generated, at last in part, in response to activation a particular object in the game.

10. The method of claim 7 wherein the request is generated, at least in part, in response to interaction with a particular object in the game.

11. The method of claim 1 further comprising:
determining that the particular point in time is after the target point in time;
in response to determining that the particular point in time is after the target point in time, undoing the subset of captured participant inputs.

12. A system comprising:
one or more processors;
one or more non-transitory computer-readable media storing instructions, which when executed by the one or more processors, cause:
during a period of gameplay of a game by one or more participants, capturing inputs received from the one or more participants;
generating and storing one or more electronic records of the gameplay comprising the captured participant inputs and one or more game states;
wherein each game state of the one or more game states correspond to a respective point in time during the period of gameplay;
wherein each of the captured participant inputs were captured at a corresponding time during the period of gameplay;
receiving a request to initiate subsequent gameplay from a target point in time that occurred during the period of gameplay;
causing the subsequent gameplay to begin executing on at least one computing device from the target point in time by:
loading a particular game state of the one or more game states, the particular game state corresponding to a particular point in time that is near the target point in time;
identifying a subset of captured participant inputs that were captured between the particular point in time and the target point in time;
determining that the particular point in time is before the target point in time;
in response to determining that the particular point in time is before the target point in time, replaying the subset of captured participant inputs.

13. The system of claim 12, wherein the instructions, when executed by the one or more processors, further cause flagging one or more points in time in the one or more electronic records, and causing display of a replay interface that graphically marks the one or more flagged points in time on a timeline that represents at least the period of gameplay.

14. The system of claim 13 wherein flagging the one or more points in time includes detecting a change in a rate at which participant input is provided by a particular participant during the period of gameplay and, in response to detecting the change, flagging a time of the change in the one or more electronic records.

15. The system of claim 13 wherein flagging the one or more points in time includes detecting pausing of the game during the period of gameplay and, in response to detecting pausing of the game, flagging a time of pausing of the game in the one or more electronic records.

16. The system of claim 13 wherein flagging the one or more points in time includes detecting a change in a number of participants during the period of gameplay and, in response to detecting the change, flagging a time of the change in the one or more electronic records.

17. The system of claim 13 wherein flagging the one or more points in time includes detecting a divergence in one or more of: score, resource collection, unit production, unit death, or technology production between two or more participants and, in response to detecting the divergence, flagging a time of the divergence in the one or more electronic records.

18. The system of claim 12 wherein the request is generated during gameplay of the game by the one or more participants.

19. The system of claim 18 wherein the request is generated, at least in part, in response to detecting a particular event in the game.

20. The system of claim 18 wherein the request is generated, at last in part, in response to activation a particular object in the game.

21. The system of claim 18 wherein the request is generated, at least in part, in response to interaction with a particular object in the game.

22. The system of claim 12, wherein the instructions, when executed by the one or more processors, further cause:
determining that the particular point in time is after the target point in time;
in response to determining that the particular point in time is after the target point in time, undoing the subset of captured participant inputs.

23. A method comprising:
during a period of gameplay of a game by one or more participants, capturing inputs received from the one or more participants;
generating and storing one or more electronic records of the gameplay comprising the captured participant inputs and one or more game states;
wherein each game state of the one or more game states correspond to a respective point in time during the period of gameplay;
wherein each of the captured participant inputs were captured at a corresponding time during the period of gameplay;
receiving a request to initiate subsequent gameplay from a target point in time that occurred during the period of gameplay;
causing the subsequent gameplay to begin executing on at least one computing device from the target point in time by:
loading a particular game state of the one or more game states, the particular game state corresponding to a particular point in time that is near the target point in time;
identifying a subset of captured participant inputs that were captured between the particular point in time and the target point in time;
determining that the particular point in time is after the target point in time;
in response to determining that the particular point in time is after the target point in time, undoing the subset of captured participant inputs.

24. The method of claim 23 wherein the request is generated during gameplay of the game by the one or more participants.

25. The method of claim 23 wherein the request is generated, at least in part, in response to one or more of:

detecting a particular event in the game, activation a particular object in the game, and interaction with a particular object in the game.

26. The method of claim 23 further comprising flagging one or more points in time in the one or more electronic records, and causing display of a replay interface that graphically marks the one or more flagged points in time on a timeline that represents at least the period of gameplay.

27. A system comprising:
one or more processors;
one or more non-transitory computer-readable media storing instructions, which when executed by the one or more processors, cause:
during a period of gameplay of a game by one or more participants, capturing inputs received from the one or more participants;
generating and storing one or more electronic records of the gameplay comprising the captured participant inputs and one or more game states;
wherein each game state of the one or more game states correspond to a respective point in time during the period of gameplay;
wherein each of the captured participant inputs were captured at a corresponding time during the period of gameplay;
receiving a request to initiate subsequent gameplay from a target point in time that occurred during the period of gameplay;
causing the subsequent gameplay to begin executing on at least one computing device from the target point in time by:
loading a particular game state of the one or more game states, the particular game state corresponding to a particular point in time that is near the target point in time;
identifying a subset of captured participant inputs that were captured between the particular point in time and the target point in time;
determining that the particular point in time is after the target point in time;
in response to determining that the particular point in time is after the target point in time, undoing the subset of captured participant inputs.

28. The system of claim 27 wherein the request is generated during gameplay of the game by the one or more participants.

29. The system of claim 27 wherein the request is generated, at least in part, in response to one or more of: detecting a particular event in the game, activation a particular object in the game, and interaction with a particular object in the game.

30. The system of claim 27 wherein the instructions, when executed by the one or more processors, further cause flagging one or more points in time in the one or more electronic records, and causing display of a replay interface that graphically marks the one or more flagged points in time on a timeline that represents at least the period of gameplay.

* * * * *